United States Patent [19]

Stanev et al.

[11] 3,939,691
[45] Feb. 24, 1976

[54] METHOD AND APPARATUS FOR IMPACT TESTING RAILROAD CARS

[75] Inventors: Tzvyatko Penchev Stanev; Adrian Kostov Lambiev, both of Sofia, Bulgaria

[73] Assignee: DSO "Bulgarski Darjavni Jeleznitzi", Sofia, Bulgaria

[22] Filed: Sept. 10, 1973

[21] Appl. No.: 396,049

[52] U.S. Cl............................. 73/11; 73/12
[51] Int. Cl.²........................... G01M 17/04
[58] Field of Search.................... 73/11, 12

[56] References Cited
UNITED STATES PATENTS

| | | | |
|---|---|---|---|
| 1,290,318 | 1/1919 | O'Connor | 73/11 |
| 1,303,948 | 5/1919 | O'Connor | 73/12 X |
| 1,583,109 | 5/1926 | Banschbach | 73/11 |

*Primary Examiner*—Charles A. Ruehl
*Attorney, Agent, or Firm*—Karl F. Ross; Herbert Dubno

[57] ABSTRACT

A railway-car impact-testing method and apparatus whereby the active railway-car is caused to move down an incline and impact against a passive railway-car, the momentum of which is braked by a force storing means which then transfers stored force to the latter car to displace the cars in the opposite direction. A drive rope flanking the rails is used to displace the cars to their respective positions or to brake the displacement of the cars.

13 Claims, 19 Drawing Figures

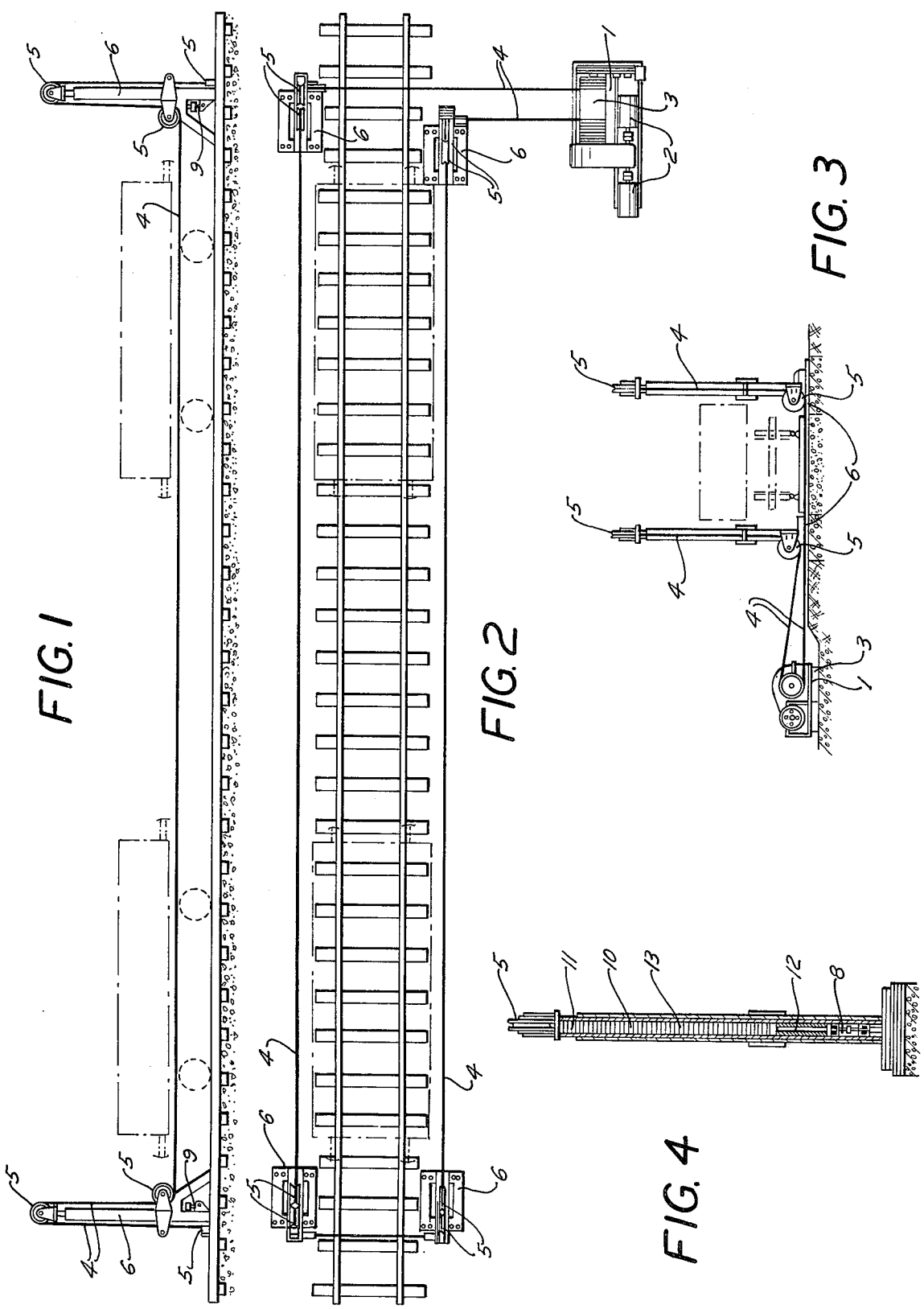

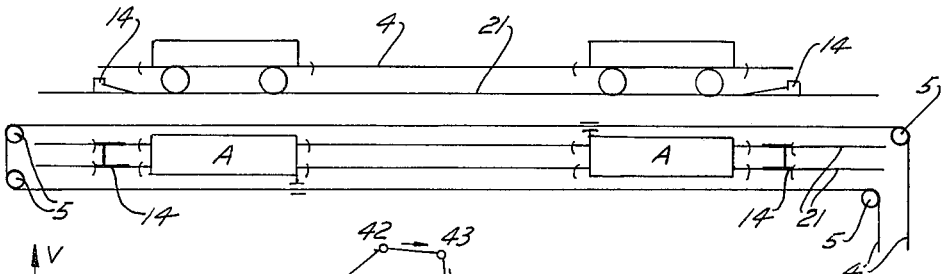
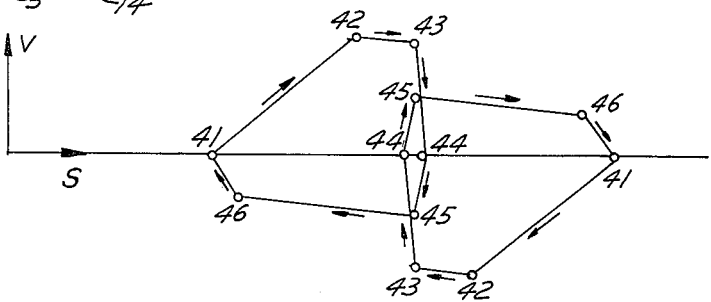
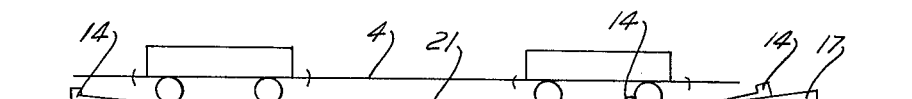
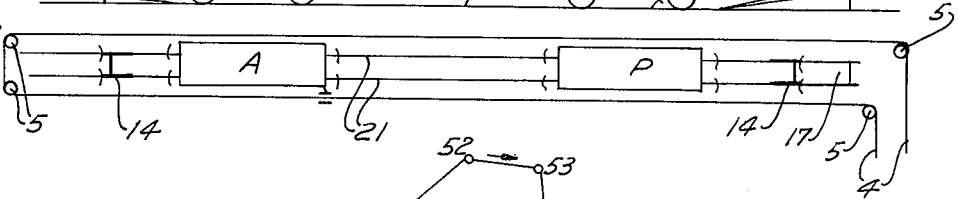
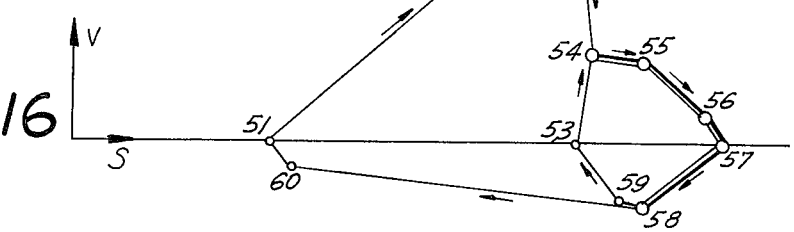
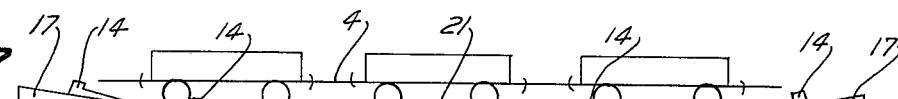
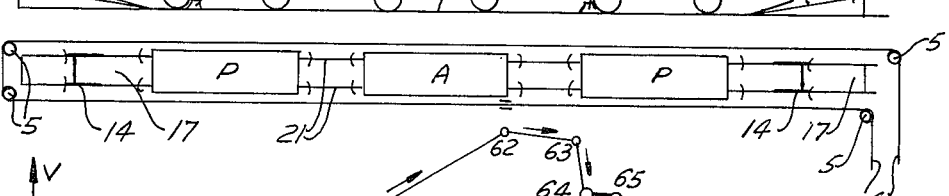
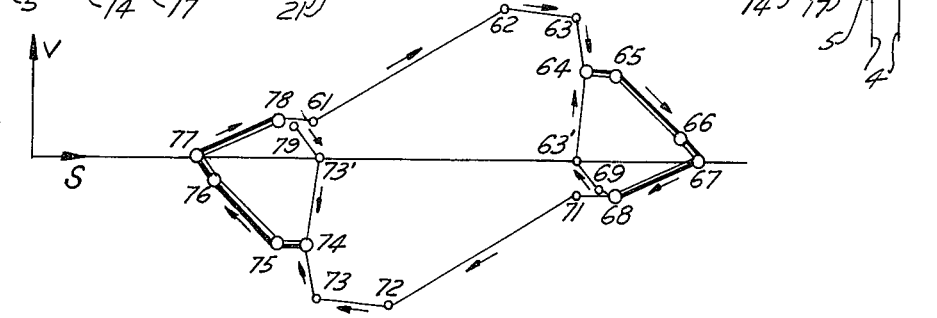

METHOD AND APPARATUS FOR IMPACT TESTING RAILROAD CARS

The present invention relates to a method of and an apparatus for carring out impact tests (chiefly tests of long duration for determining operation life) of railway cars, railway vehicles in general, various railway-car assemblies and parts thereof, as well as on various structures placed on an undercarriage and moving upon a railway.

Impact tests of a high number of cycles and of long duration have recently acquired special importance and have been widely applied for determining the operation life of structures, especially railway car structures, as well as various railway-car assemblies and parts thereof.

The classical method for carrying out impact tests on railway cars makes use of a locomotive. This method requires repeated and dangerous maneuvering, coupling and decoupling of the railway cars and it has the following significant disadvantages: low efficiency (12–20 impacts per hour), a need for a maneuvering staff, high energy consumption, and difficulty, of control. Constant conditions are hard to maintain and the railway cars are difficult to connect to the measuring equipment because of the relatively long distances to be covered. There is another well-known method for carrying out impact tests on railway cars, which is considerably better than the one described above and is characterized by a hump construction with capstan employed in it. According to this method the railway car (or group of cars) to be tested is accelerated down the slope of the hump and bumps into an immovable cross-wall, a foundation or into another railway car (or cars), which is into a state of rest before the impact. After the impact the first railway car is brought back by means of a capstan to its initial position. A definite spot on the hump provides a predetermined velocity for the impact. This method, however, only partially removes the disadvantages mentioned above: the efficiency is still comparatively low (20–30 impacts per hour), the energy consumption is rather high, the distances for speeding up and shifting the railway car are long and provide difficulties for measurement and recordal of the different values.

It is an object of this invention to remove the above mentioned disadvantages, according to the invention the impact railway car, attached to a rope, streched along the railway track, is accelerated by a capstan which brings it motion and when the railway car reaches the assigned velocity, it hits into another railway car (or a group of cars), whereupon it is brought back to the initial position by the same capstan, usually using the energy provided by the impact in the reverse direction. Just before the stroke the engines of the capstan are switched off as a rule, and if it is necessary to insulate the influence of the masses in motion of the capstan system, the impact (active) railway car can be detached from the driving capstan rope. The method of operating the appratus can involve automatic or hand control over one of the following three programs.

According to a first program, two impact railway cars (or groups of cars) move in opposite directions and under the same conditions by rebound after each impact, and, using the energy of the impact, move back to the initial position. When this energy is not sufficient the capstan draws the railway car backwards; in case the energy is too much, the capstan brakes the railway car (mechanically or electrically), or the railway car's own brakes are used, or else rail braking gears are provided. Two or more of these techniques can be used in combination. In a second program, a railway car or a plurality of railway cars can be attached to the rope and accelerated. The accelerated car is the so called "active" car and performs the impact, while the other car is the so called "passive" railway car, or the one that bears the impact. The latter car is free and in a state of rest before the impact. After the impact the passive railway car, moving in the direction of the impact (either by itself or coupled with the active railway car) climbs a sloping ramp, with its front wheel pair (leading bogie) or bears against a spring assembly for accumulation of the impact energy. After the speed has been reduced the passive railway car together with the active one is accelerated in the opposite direction by the accumulated energy, then the two railway cars separate and the passive one is brought back to its initial position by means of rail braking equipment. The active railway car continues to move by itself under its own momentum or pulled by the capstan in the opposite direction, whereupon it is stopped its initial position by means of the capstan (mechanical or electrical stopping), or through its own car brake, or by means of rail braking gears, individually or in combination.

The third program utilizes by two passive railway cars disposed at opposite sides of the active car which hits them one after the other, being accelerated first in one direction and then in the opposite direction without stopping in any definite initial position. The slow down of the railway cars after the impact and their positioning in and retention of the initial position is achieved in the same way as under the second program.

The construction embodying the method described above consists of a railway track, a capstan supplied with a driving rope, columns with guide rollers and energy absorbers, a control system and an automatic system for driving the capstan, a device for accumulating the impact energy and for returning the railway cars, rail braking mechanism, devices for connecting the railway car (or cars) to the rope, and, if necessary, a system for automatically hooking the car on and unhooking the railway car from the rope.

The invention is more fully described with reference to the accompanying drawing in which FIG. 1 is a lateral view of the apparatus according to the invention in its general aspect, FIG. 2 is a top plan view of the apparatus;

FIG. 3 is a cross-section of the same construction;

FIG. 4 is a cross-section of one of the columns with the guide rollers and the energy absorbers.

FIGS. 11 and 12 are diagrams of the system operating under the first program in a lateral view and in a plan view respectively;

FIG. 13 is a diagram of the processes under the first program;

FIGS. 14 and 15 are diagrams of the system at work under the second program, in lateral view and in plan view, respectively;

FIG. 16 is a diagram of the processes under the second program;

FIGS. 17 and 18 are diagrams of the system at work under the third program, in lateral view and in plan view respectively; and FIG. 19 is a diagram of the processes under the third program.

Figure 5:
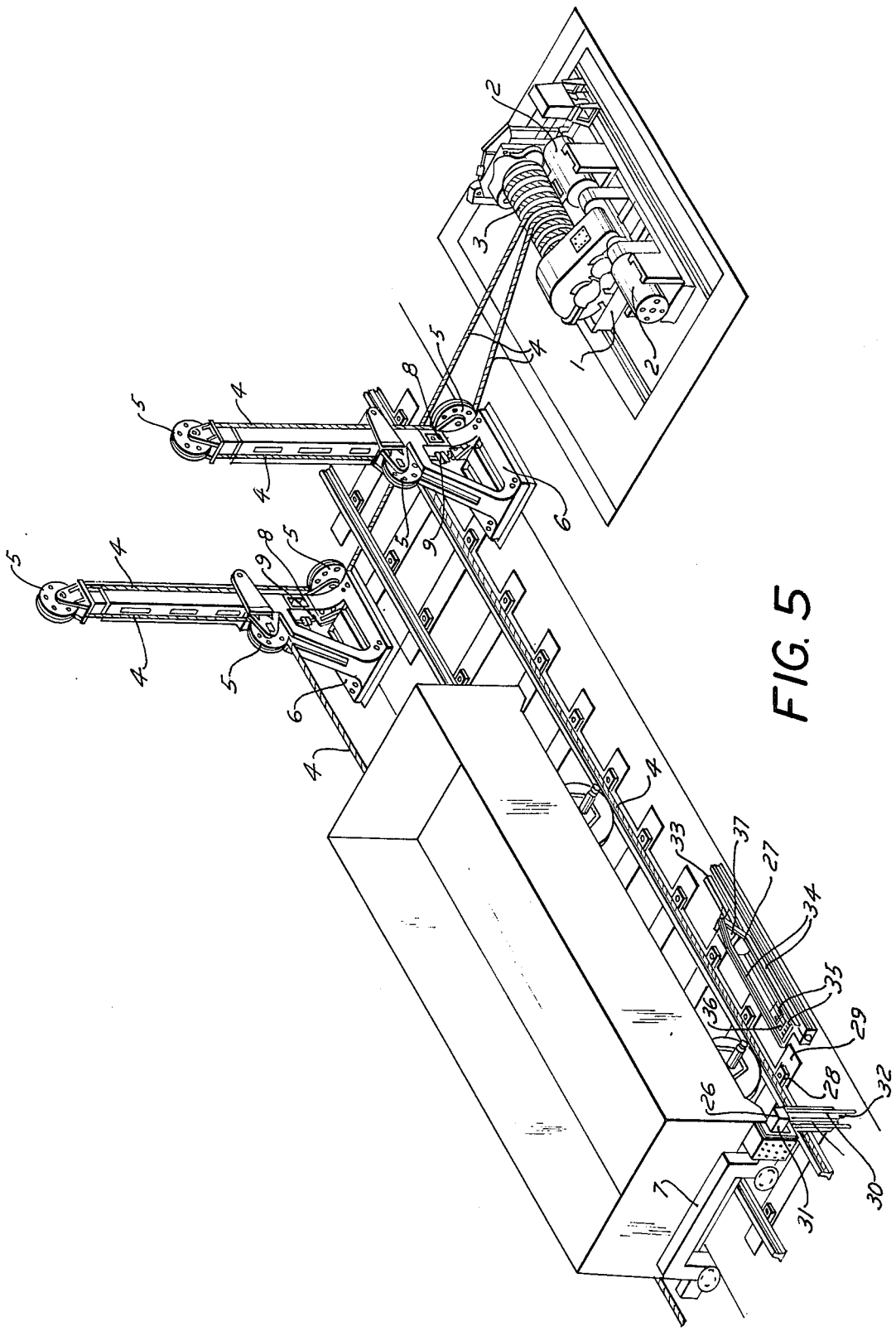
FIG. 5 is an axonometric view of a part of the structure for one part of the operating cycle.

The capstan 1 (FIGS. 2, 3 and 5) is driven by direct-current motors 2 and has a drum 3 upon which the two ends of the driving rope 4 are wound. (It is possible for the capstan to work with an endless rope or with two drums connected with each other.) The driving rope 4, guided by a system of rollers 5 which are mounted on the corner columns 6 (FIGS. 1–5), is streched along both sides of the railway track (or along one side only), usually at the level of the railway car bumpers. The driven railway car (or group of cars) is connected with the driving rope immovable or movably (with or without any possibility for automatic unhooking or hooking- according to what the process requires). The connection of the rope with the car or cars is by a respective load-bearing element with a lateral projection, for instance a cross beam 7 (FIG. 5) attached to the front beam of the railway car by means of the bumper bolts.

The columns 6, usually placed along the railway track, are load-bearing structures with a system of rollers 5 for directing the rope 4 and are supplied with energy absorber devices 8 and 9 (FIGS. 1, 4 and 5) for tightening the rope. The elastic element of the energy absorber consists of metal-rubber packets 10 (FIG. 4), placed in a sleeve 11 connected with the top roller, which sleeve is closed at the bottom by the supporting plunger element 12 and moves in the body 13 of the column. The position of the sleeve is defined by the position of the supporting plunger element 12 fixed by means of the tightening device 8 and the compression of the elastic element, caused by stretching the rope.

Figure 6:
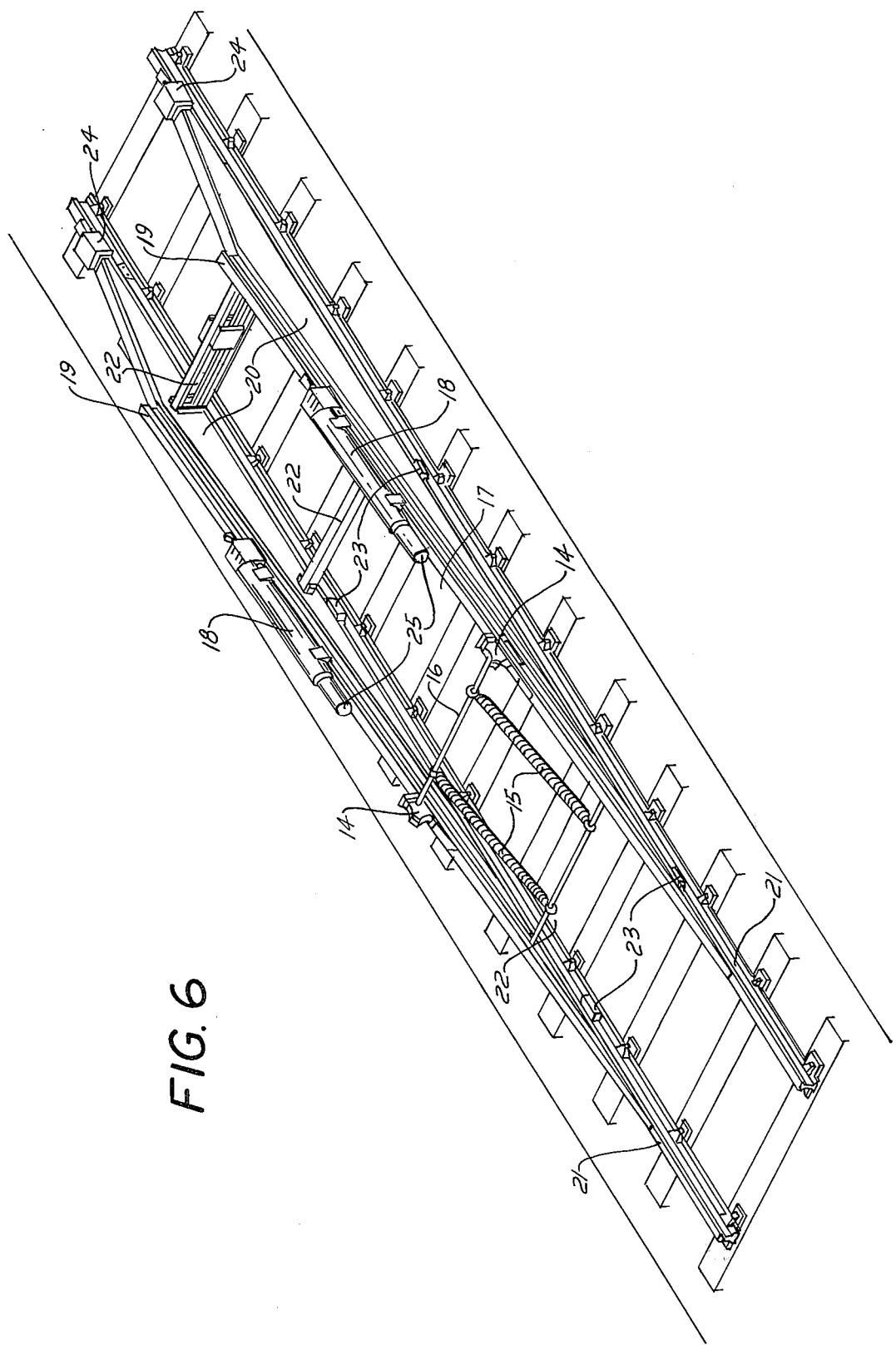
FIG. 6 is an axonometric view of a device for accumulation of the impact energy i.e. a sloping ramp, rail braking mechanism and their mounting assemblies.

The rail braking gear seen in FIG. 6 consists of a pair of rail brake shoes 14, connected with each other, and meant to be returned to their initial position by means of coil springs 15 attached to the shoes (or to the spacer element 16 connecting them) and stretching during the process of braking. The rail braking mechanism can be attached either to the rails of the sloping ramp, as shown in FIG. 6, or directly to the rails of the rail track (which case is not shown in the drawing.).

The device for accumulating the impact energy (FIG. 6) consists of a sloping ramp 17, a spring repulsion mechanism of the bumper type 18 or a combination of the two.

In FIG. 6, the sloping ramp consists of the rails 19 with load-bearing wedge-shaped bases 20, placed on the rails 21 of the roadbed and interconnected by the traverses 22. Lateral displacement of the ramp is prevented by stops 23, and longitudinal displacement in the direction of force application by brakeshoes 24, mounted on the rails and operating in accordance with the principle of self-locking wedge elements. The spring repulsion mechanisms 18 of the bumper type, are attached to the rails 21 of the railway track (or to the sloping ramp, as shown in the drawing) at a proper distance from the brake shoes, and are held against longitudinal displacement also by means of the brakeshose 24. The rail brakes 14 are made so that their front parts engage the sleeve 25 of the mechanism 18, when encountered by the wheels of the railway car.

Figure 7:
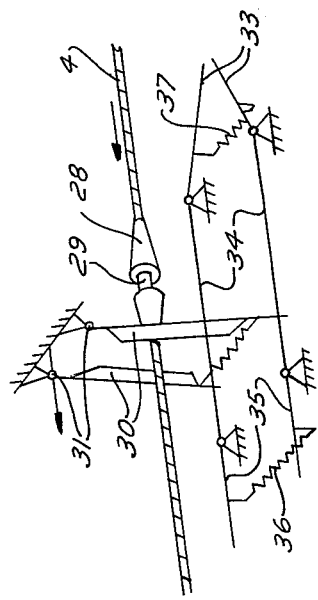
FIGS. 7, 8, 9 and 10 are function diagrams of the system for automatic unhooking of the railway car from the rope and its hooking to the same rope at various positions.
Figure 8:
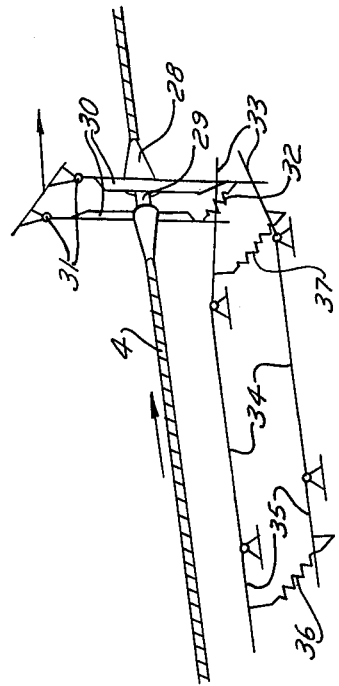
Figure 9:
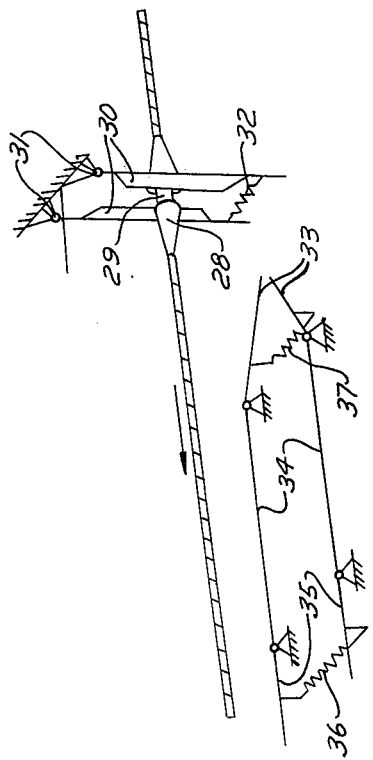
Figure 10:
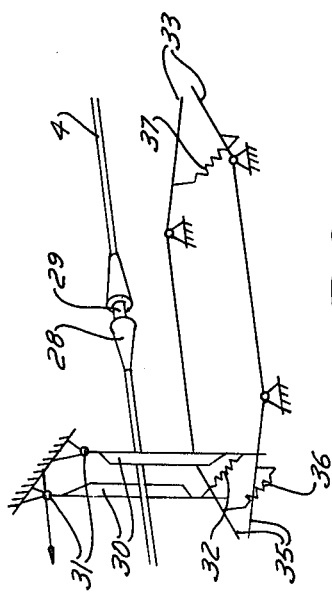

The system for automatically hooking the car to or unhooking the car from the rope (FIG. 5) consists of a scissor-shape hinge mechanism 26 attached to the railway car, an expanding mechanism 27 for expanding the scissors fixed to the ground and a coupling element 28, immovably attached to the rope and having the shape of a double cone with a circular groove 29 in its middle part. When the scissor-shape jaws 30 pivoting at the hinge 31 and biased together by the spring 32, enter the groove 29, the railway car is hooked on the rope 4 (FIGS. 7 and 10). The unhooking of the railway car from the rope is performed when the railway car moves by the expansion of the jaws 30 by the jaws 33 of the expanding mechanism 27 which form an acute angle. While the sliding guides 34 hold apart the jaws 30, the coupling element 28 slips off it. The coupling element 28 usually falls behind the scissor mechanism 26 (FIG. 8) because the process of unhooking is performed, as a rule, when the motors are switched off and the car and rope motions are inertial since the drag on the capstan is higher than that of the railway car (or rather, can be made higher by very slight braking), the cable element 28 is left behind. In order to prevent a strong impact when the jaws 30 close under the force of the spring 32, the rear guides 35 close against the spring 36 which normally keeps them open (parallel) compresses under the influence of the spring 32 of the scissors-shape jaws (FIG. 9). For the reverse movement of the railway car the front jaws 33 of the expanding mechanism, normally kept closed by the spring 37, are forced to open to allow for the scissor-shape jaws 30 to pass from the inside (FIG. 10).

In a first mode of operation (FIGS. 11, 12 and 13), the motors are switched on at 41 and accelerate the two impact railway cars, accelerating the railway cars (41, 42) before the impact switching off the motors 42; permitting inertial motion (42, 43) before the impact unlocking the cars from the beginning of impact 43; rebound 44 from the impact; end of the impact 45; movement of the car away after the impact and hooking to the rope. If the impact energy is not sufficient to return the railway cars to their initial position the motors can then be switched on to pull the railway cars in the reverse direction. The cars are braked (46) to place them in their initial position.

In the second program, according to FIGS. 14, 15 and 16 the sequence is the following:

51- switching on the motors and starting to accelerate the active railway car "A";

51–52- accelerating the active railway car before the impact;

52- switching off the motors;

52–53- moving the active railway car before the impact with the motors switched off possibly unhooking the rope;

53–53' starting of impact for the active and the passive railway car, respectively; 54- end of the impact;

54–55- horizontal motion of both railway cars after the impact in a coupled or uncoupled state;

55- the passive railway car "P" ascends the ramp with its front bogie;

55–56- decelerated movement of both railway cars ascending the ramp;

56–57- mechanical braking by means of rail brakeshoes or the car brakes;

57–58- acceleration of both railway cars along the sloping rails in the reverse direction;

58–59- inertial motion;

59–53- braking the passive railway car by means of rail brakeshoes and restoration to initial position or rather in a position to await the next blow impact;

59–60- inertial motion of the other railway car to its initial position or by the rope;

60–51- braking of the active railway car in order to return it to its initial position either by means of the capstan railway car brake or brakeshoes, as shown in the drawings.

In the third program, as shown in FIGS. 17, 18 and 19 the sequence is as follows:

61–62- accelerating the active railway car "A" to the right by means of the capstan;

62–63- the active railway car moves with the motors switched off and is possibly unhooked from the rope;

63–63'- beginning of the impact for the active railway car and the right passive car;

64- end of the impact;

64–65- after the impact both railway cars move along a horizontal line in a coupled state (as shown in FIG. 19) or in an uncoupled state;

65–66- decelerated motion of the two railway cars while the first bogie of the right passive railway car ascends the rails of the right ramp;

66–67- braking the railway cars by means of the brakeshoes on the ramps as shown in FIG. 17;

67–68- accelerating the right passive railway car coupled with the active one along the ramp in the reverse direction as shown in FIG. 19 (the railway cars can be uncoupled as well);

68–69- inertial motion of the two railway cars (the active one and the right passive one);

69–63' braking the right passive railway car by means of rail braking shoes, for example, and its fixing in the initial waiting position;

68–71 inertial motion of the active railway car, uncoupled from the passive car;

71–72- accelerating the active railway car in the reverse direction by the capstan;

72–73- the active railway car moves with motors switched off to the left passive railway car and is possibly unhooked from the rope;

73–73'- beginning of impact for the active and the left passive railway car respectively;

74- end of the impact. The processes with the left passive railway car occur in the same way as do the processes with the right railway car, whereupon the active railway car is accelerated to the right.

In case the railway cars happen to couple through their automatic couplers, the second and the third program can be carried out without a ramp (without any device for accumulating the energy after the impact) provided that the railway car is stopped after the impact by means of capstans (mechanically or electrically) or through the railway car brake.

The efficiency of the system depends on the power of the capstan, mass of the railway cars accelerated and the speed at the impact. When the latter is 10 kms/hr for 80 ton railway cars and capstan power 150–200 kw, the efficiency of the system is approximately 300–400 impacts per hour under the first and the third programs, and 150–200 impacts per hour under the second program. Consequently, the above-described system has approximately 5–10 times greater efficiency than the systems known hitherto.

What we claim is:

1. A method of impact-testing a railway car comprising the steps of:

entraining a first railway car along a stretch of track from an initial position with a drive rope displaced alongside said track;

intercepting the first railway car with a second railway car under impact, thereby causing said second railway car to rebound along said track in the direction of displacement of the first railway car;

braking the momentum of said second railway car while storing force upon the braking of the momentum of said second railway car; and displacing said second railway car in the opposite direction along said track at least in part with the stored force.

2. The method defined in claim 1 wherein both of said railway cars are initially accelerated by said drive rope in opposite directions toward one another and rebound away from one another, each railway car being braked upon rebounding to generate a stored force at least in part serving to displace them in the direction opposite to their direction of rebound.

3. The method defined in claim 1 wherein said second car is in a position of rest prior to acceleration of said first car thereagainst.

4. The method defined in claim 3 further comprising the step of coupling both said cars upon impact whereby said first car continues with said second car in its direction of displacement and is braked with said second car to generate the stored force.

5. The method defined in claim 4 whereby both of said cars are returned to an intermediate position along said track by said stored force and said cars are thereafter decoupled and said second car is retained at said intermediate position while said first car is entrained to its said initial position by said rope.

6. The method defined in claim 4 wherein, upon braking of the momentum of said coupled cars, said first car is decoupled from said second car and returned in the opposite direction at least in part by the stored force.

7. The method defined in claim 1 wherein the force is stored in part as potential energy by causing said second car to ride up a sloping ramp.

8. The method defined in claim 1 wherein said force is stored as spring force by compression of a spring under impact of said second car.

9. An apparatus for the impact-testing of railway cars comprising:

a length of track;

force-storing means at one end of said length of track for braking the momentum of a railway car and producing a stored force thereby;

a drive rope extending along said track for displacing an active railway car therealong;

a capstan operatively connected to said rope for displacing same;

a plurality of columns flanking said track and provided with guide rollers over which said rope is passed;

energy-absorbing means in said columns for yieldably supporting said pulleys;

means for hooking an active railway car to said rope for entrainment thereby; and another railway car positioned on said track and engageable under impact by said active railway car to rebound along said track and cooperate with said force-storing means, said force storing means displacing said another railway car in the direction opposite its rebound direction with said stored force.

10. The apparatus defined in claim 9 wherein said force-storing means includes a ramp.

11. The apparatus defined in claim 9 wherein said force-storing means includes means for braking the displacement of said rope.

12. The apparatus defined in claim 9 wherein said force-storing means includes a rail braking mechanism.

13. The apparatus defined in claim 9 wherein said force-storing means includes a spring loaded bumper engageable by said another railway car.

* * * * *